(12) United States Patent
Shlakhetski et al.

(10) Patent No.: US 9,407,129 B2
(45) Date of Patent: Aug. 2, 2016

(54) BRUSHLESS DC MOTOR

(71) Applicant: VASTECH HOLDINGS LTD., London (GB)

(72) Inventors: Victor Shlakhetski, Ashqelon (IL); Alexander Mostovoy, Ashqelon (IL); Sergey Zatsarinin, Omsk (RU); Simen Shoikhedbrod, Ashqelon (IL)

(73) Assignee: VASTECH HOLDINGS LTD., London (GB)

( * ) Notice: Subject to any disclaimer, the term of this patent is extended or adjusted under 35 U.S.C. 154(b) by 0 days.

(21) Appl. No.: 14/384,059

(22) PCT Filed: Mar. 19, 2013

(86) PCT No.: PCT/IL2013/050253
§ 371 (c)(1),
(2) Date: Sep. 9, 2014

(87) PCT Pub. No.: WO2013/140400
PCT Pub. Date: Sep. 26, 2013

(65) Prior Publication Data
US 2015/0035403 A1 Feb. 5, 2015

(30) Foreign Application Priority Data

Mar. 20, 2012 (IL) .......................................... 218743

(51) Int. Cl.
*H02K 21/12* (2006.01)
*H02K 1/27* (2006.01)
*H02K 7/08* (2006.01)
*H02K 7/116* (2006.01)
(Continued)

(52) U.S. Cl.
CPC .............. *H02K 21/12* (2013.01); *H02K 1/2726* (2013.01); *H02K 7/083* (2013.01); *H02K 7/116* (2013.01); *H02P 6/14* (2013.01); *H02K 5/1672* (2013.01)

(58) Field of Classification Search
CPC ...... H02K 1/2726; H02K 1/278; H02K 7/116
USPC ............................................ 310/156.43, 68 R
See application file for complete search history.

(56) References Cited

U.S. PATENT DOCUMENTS 4,291,248 A * 9/1981 Rainbolt .......................... 310/14
6,252,317 B1 * 6/2001 Scheffer et al. .................. 310/46
(Continued)

FOREIGN PATENT DOCUMENTS

JP          H1052007           2/1998
JP          2002-369473 A     12/2002
(Continued)

OTHER PUBLICATIONS

International Preliminary Report on Patentability of PCT/IL2013/050253: 8 pages, completed Jul. 8, 2014.

*Primary Examiner* — Hanh Nguyen
(74) *Attorney, Agent, or Firm* — Roach Brown McCarthy & Gruber, P.C.; Kevin D. McCarthy

(57) ABSTRACT

A brushless DC motor comprises a plurality of magnets positioned at a distance from one another on a circular structure, and a plurality of solenoids provided each around a static solenoid housing, wherein said solenoid housing is structured with a void portion through which said plurality of magnets can pass when the circular structure comprising said plurality of magnets rotates around its axis.

13 Claims, 15 Drawing Sheets

(51) Int. Cl.
*H02P 6/14* (2016.01)
*H02K 5/167* (2006.01)

(56) References Cited

U.S. PATENT DOCUMENTS 8,994,238 B2 * 3/2015 Kamibayashi ................ 310/152

2002/0057069 A1 5/2002 Kushida
2009/0323208 A1 * 12/2009 Kurosawa ..................... 359/824
2011/0291504 A1 12/2011 Niedzialkowski

FOREIGN PATENT DOCUMENTS

| JP | 2009-081982 A | 4/2009 |
| WO | 9120120 | 12/1991 |

* cited by examiner

SECTION A-A

SECTION B-B

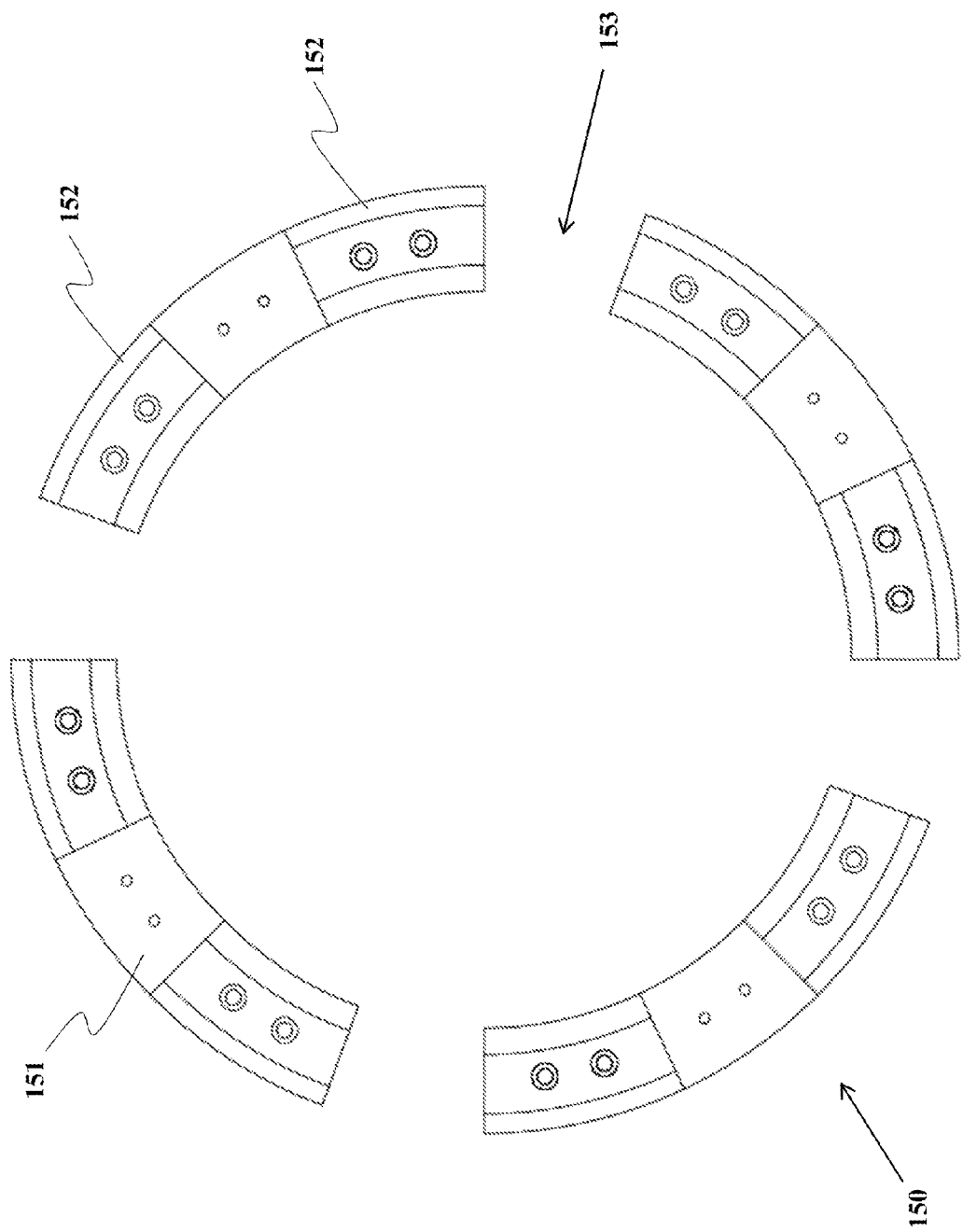

BRUSHLESS DC MOTOR

FIELD OF THE INVENTION

The invention relates to Brushless DC Motors (BLDC).

BACKGROUND OF THE INVENTION

In its simplest conceptual form (shown in FIG. 1), a BLDC motor consists of a permanent magnet 1 (the rotor) which is free to rotate around its axis of symmetry, surrounded by an arrangement of at least three fixed electromagnets (the stator) consisting of solenoid windings 2, positioned at 120° relative to each other around the rotor axis. Each solenoid is energized by applying to it a DC (Direct Current) voltage, by means of a set of electronic switches 3, operated with timing and polarity determined by a switch-control algorithm.

If the electromagnets are energized with the proper timing and polarity, they generate a magnetic field with the proper strength and direction relative to the S-N axis direction of rotor magnet 1, and this magnetic field produces a torque on the permanent magnet causing the rotor to turn. The algorithm determines the required operating sequence of the switches at any given moment, according to the actual angular position of the rotor, said position being determined by means of one or more sensors, usually of the Hall type (indicated in the figure by numeral 4), which sense the magnetic field of the rotor. The operation of the motor, which is housed in a housing 5, is controlled by a controller 6.

In the simple conceptual form of FIG. 1, it is enough to properly energize two magnets at a time in order to generate a rotating magnetic field of arbitrary direction that will keep the rotor turning. In practice, in order to obtain a continuous smooth torque value, BLDC motors are implemented using many windings for the stator, and several magnets with alternating N-S poles for the rotor.

There are two basic BLDC motor architectures known in the art: the inner rotor architecture (FIG. 2a), where the stator windings surround the rotor and are affixed to the motor's housing, and the outer rotor architecture (FIG. 2b), where the stator solenoids are affixed in the core of the motor, and are surrounded by the rotor magnets. In the prior art implementations, BLDC motors suffer from the following drawback: for a fixed supply voltage, as the motor speed increases there is a decrease in the torque that the motor can provide. This undesirable effect is the result of the generation of a parasitic voltage, known as the back EMF (Electromotive Force) voltage.

The back EMF is a voltage generated in the stator much in the same way an electric generator works, because there is relative motion between the solenoids of the stator and the magnetic field created by the permanent magnets of the rotor. The magnetic field lines created by the permanent magnets rotate along with the rotor. Thus, the projection (in the direction of the solenoid axis) of the magnetic field lines entering the cross-sectional area of each of the energized solenoids, changes with time. This projection of field lines adds up to a quantity referred to as "the magnetic flux" through the solenoid. By Lenz's law of induction, a changing magnetic flux produces an induced voltage in the solenoids (in this respect, the motor acts like a generator). The value of this induced voltage increases proportionally to the rate by which the flux changes, and therefore it increases with increasing rotating speed of the motor, and its polarity opposes the original voltage externally applied by the supply. As a result, the overall effective voltage applied to each energized solenoid of the stator decreases with increasing angular velocity of the rotor (the overall voltage equals the constant external supply voltage, reduced by the induced back EMF. Due to the decrease in the overall voltage applied, the current flowing into the solenoids of the stator decreases too, which ultimately results in a reduction of the torque provided by the motor. Therefore, the maximal torque that the motor can deliver drops as the rotating speed increases. In order to increase torque at high speed, one needs to increase the supply voltage, an operation which in many instances cannot be done.

Another adverse side effect of back EMF generation is that, for a fixed supply voltage, the current flowing in the solenoids is higher at lower rotational speed, because then the back EMF is lower and the overall voltage applied to the solenoids is higher. It follows that at start (when there is no motion, and therefore there is no flux change and no back EMF) the motor drives the highest current. Since the supply voltage is significantly higher than the overall voltage applied to the solenoids at final speed, then, at motion start one gets peaks of current that are significantly higher than the steady-state working current. Such undesirable over-current peaks may even lead to solenoid damage or power supply overload, and sometime must be dealt with, by means of added protective devices, or by an overkilled design of current handling capability.

SUMMARY OF THE INVENTION

In one aspect, the invention relates a brushless DC motor, comprising a plurality of magnets positioned at a distance from one another on a circular structure, and a plurality of solenoids provided each around a static solenoid housing, wherein said solenoid housing is structured with a void portion through which said plurality of magnets can pass when the circular structure comprising said plurality of magnets rotates around its axis. The motion of the magnets with respect to the solenoids is quasi-linear in the direction of the axis of the solenoid. The term "quasi-linear" is mean to indicate that when the magnet enters the housing of the solenoid, its movement is almost linear with respect to the axis of the solenoid. Of course, since the magnet is positioned on a circular path, the motion cannot be fully linear, and hence the term "quasi-linear" is employed. When spacers are provided between adjacent permanent magnets, they should be made of high permeability material.

As will be apparent to the skilled person, different numbers of permanent magnets and of solenoids can be provided, depending on the specific set-up of the motor. According to one embodiment of the invention the number of solenoids equals the number of permanent magnets and according to another embodiment of the invention the number of solenoids can be greater or smaller than the number of permanent magnets.

The brushless motor of the invention should be provided with one or more sensors suitable to determine the position of permanent magnets relative to solenoids. A controller should further be provided, suitable to allow the supply of current to solenoid in response to a determination by one or more sensors regarding the position of magnets relative to solenoids.

In one embodiment of the invention the permanent magnets and the high-permeability material located between them, alone or together with one or more structuring ring, form of the rotor of the motor, which is mechanically connected to power-transmitting means, e.g., by a toothed element.

In another aspect the invention relates to a method for operating a brushless DC motor, comprising causing a plurality of magnets to move with respect to a plurality of solenoids in a quasi-linear motion in the direction of the axis of the solenoid.

BRIEF DESCRIPTION OF THE DRAWINGS

In the drawings:

FIG. 15 illustrates an alternative rotor architecture; and

DETAILED DESCRIPTION OF THE INVENTION

The invention is concerned with a novel type of BLDC motor architecture, which leads to a major reduction of back EMF levels, thus yielding a motor capable of providing a constant torque value regardless of the angular velocity of the rotor. As a side benefit of the reduced back EMF, the overall applied voltage is nearly constant, and therefore no overcurrent peaks at start will occur.

The cause of back EMF generation in prior-art BLDC, is the change in magnetic flux through the solenoids of the stator. This flux change is due to the spinning of the rotor, which produces both changes in the magnetic field strength present within the core of the solenoid (as a magnet of the rotor approaches a solenoid or moves away from it), as well as changes in the direction of the field lines with respect to the axis of the solenoids (a change in the component of the magnetic field crossing the core of the solenoid parallel to its axis produces a change in magnetic flux through it). During the circular movement of the magnets of the rotor, there is a change both in the distance between magnets and solenoids and in the direction of the magnetic field lines relative to the solenoids axis, which both result in flux changes through the solenoids. The architecture subject of the invention reduces the back EMF effect by reducing the above-mentioned flux changes.

Figure 1:
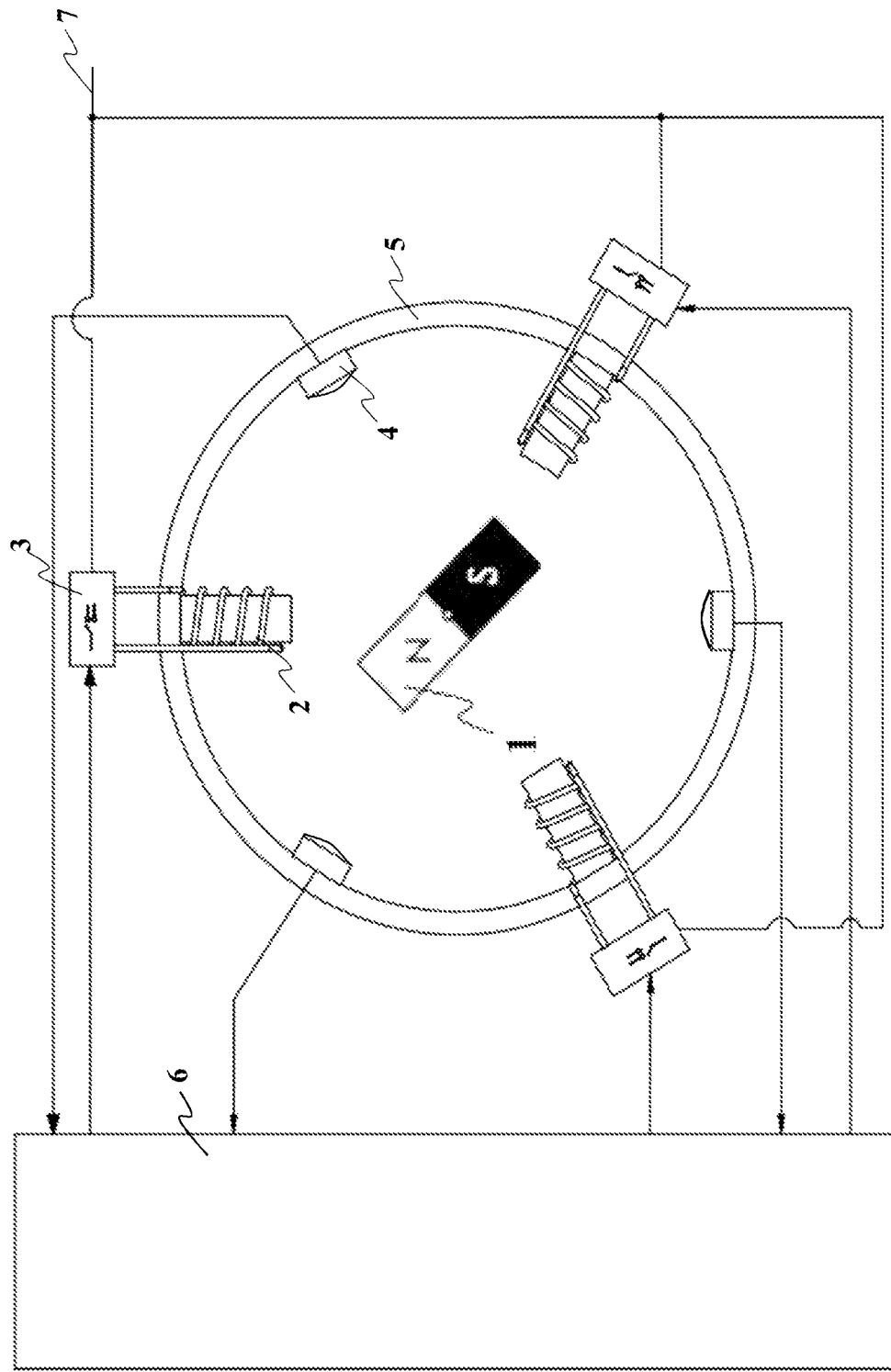
FIG. 1 schematically shows a prior art motor.
Figure 2B:
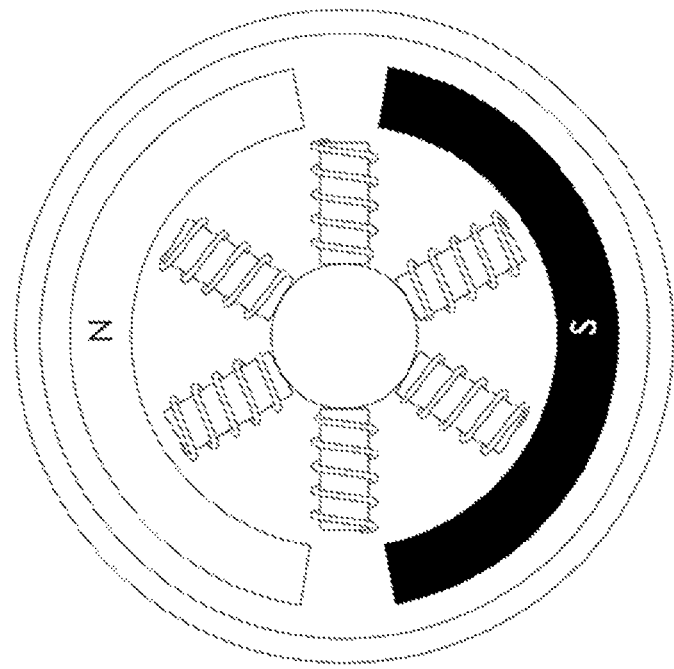
FIGS. 2(a) and (b) shows two prior art architectures for a brushless motor.
Figure 2A:
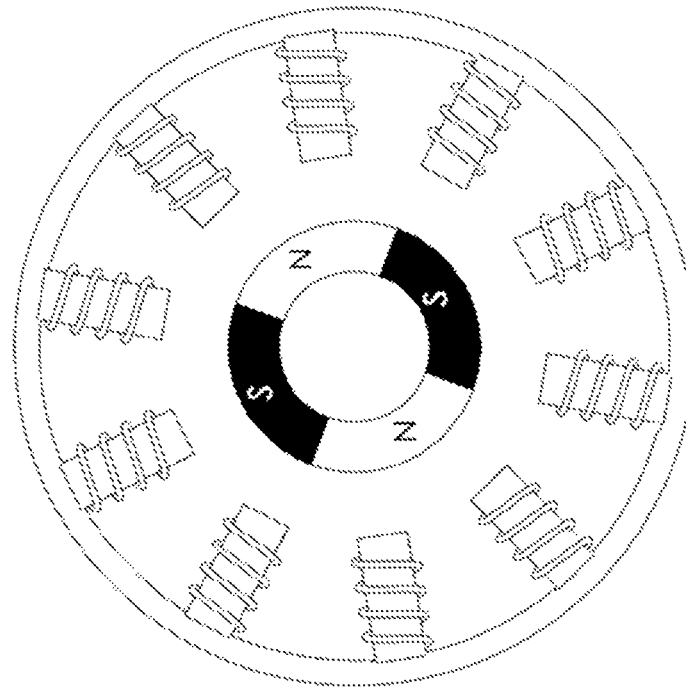
Figure 3:
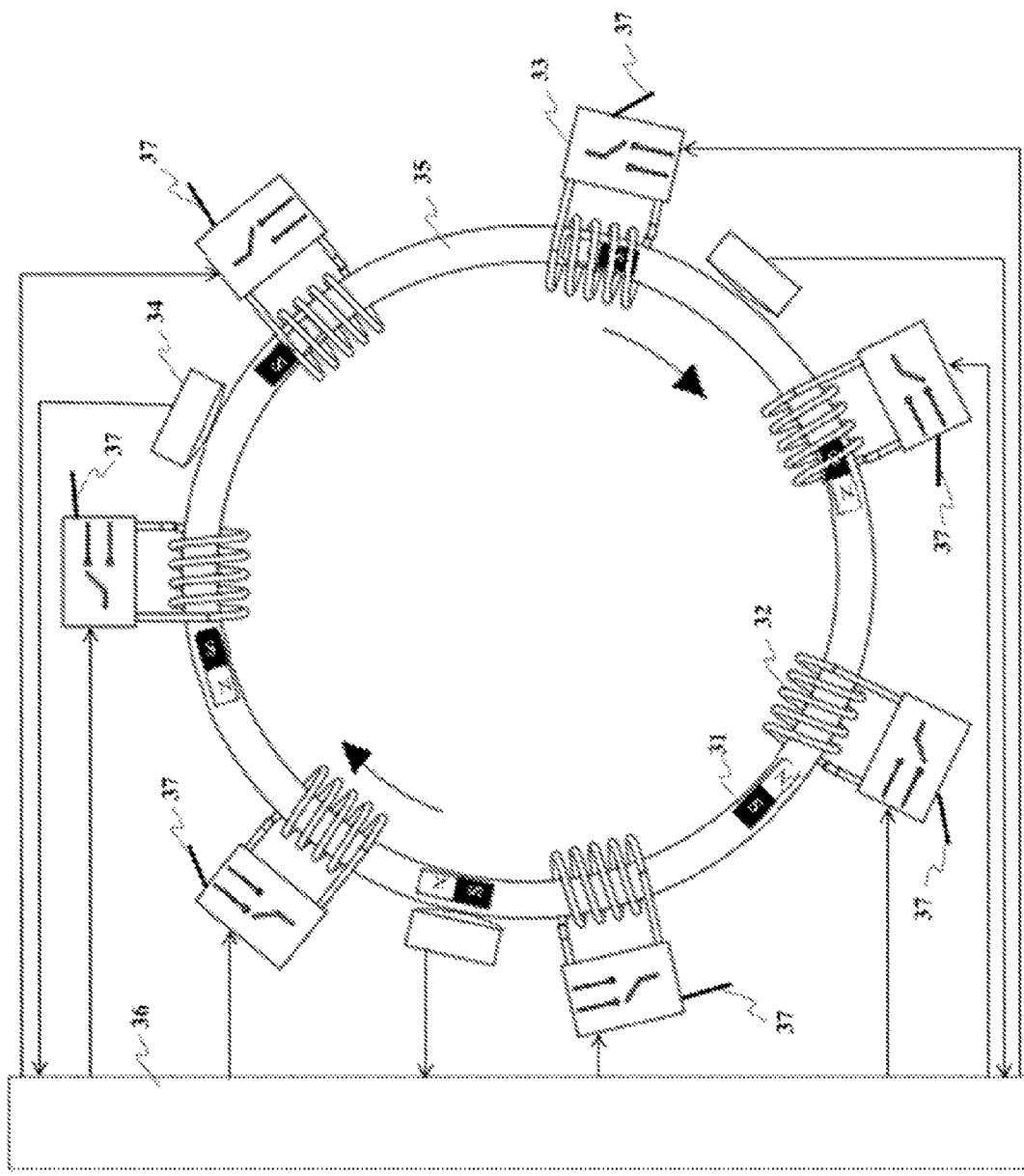
FIG. 3 schematically shows the architecture of a motor according to one embodiment of the invention.
Figure 5:
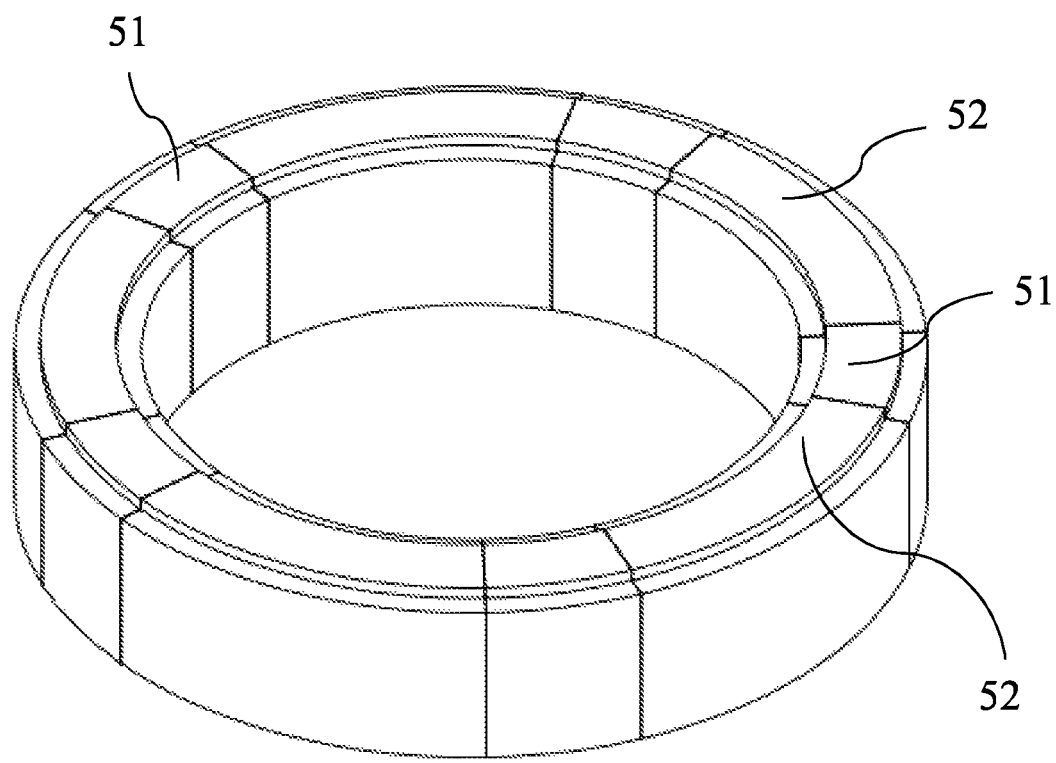
FIG. 5 is a schematic representation of a rotor according to one embodiment of the invention.

The motor architecture according to an embodiment of the invention is schematically shown in FIG. 3, for the purpose of explaining the principle by which it operates. The stator architecture consists of a number of air-core solenoids 32 affixed to the motor housing, and whose axis of symmetry is aligned along a circular path 35. The basic rotor architecture consists of a number of permanent magnets 31 whose S-N axis is aligned with alternate polarity along the same circular path as the stator. The magnets may either be connected to each other with a high-permeability material to form a continuous circular ring as shown in FIG. 5, or may be mounted onto a circular flat base 35 and the space between them may be left open to air as in FIG. 3. The number of magnets may be larger, equal, or smaller than the number of the solenoids.

Figure 6:
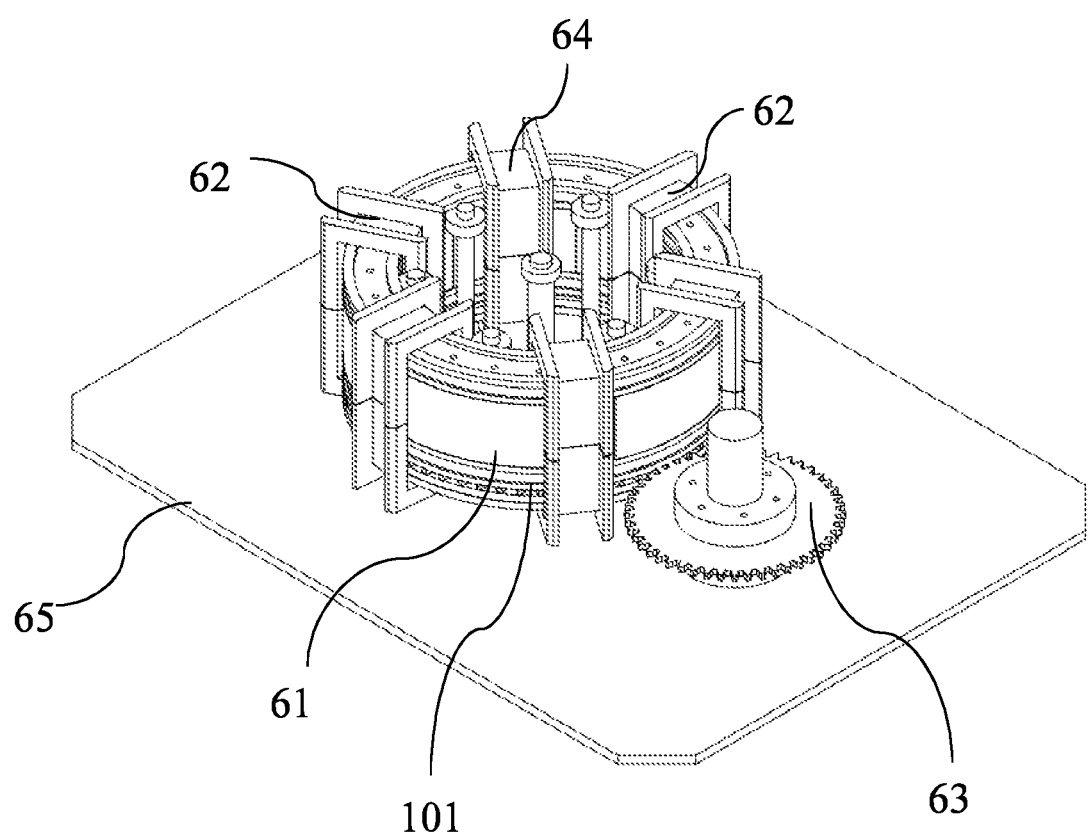
FIG. 6 illustrates a motor according to one illustrative embodiment of the invention, in assembled state.

The rotor is supported by rotating mechanical bearings (not shown) and is free to rotate around the center of its circular shape while passing inside the core of the solenoids of the stator as shown in FIG. 6. The solenoids are electrically connected to the DC supply through a system of switches 33, preferably, but not limitatively, of the electronic type, which determines, at each instant, the polarity and the level of the voltage applied to each solenoid in the stator. The switches are controlled by an apparatus, preferably a microcontroller 36 with associated software, which determines at each instant the DC polarity applied to each solenoid (e.g., by inverting the DC connection to it), as well as the average DC level (e.g., by applying the DC supply voltage using Pulse Width Modulation (PWM)). The angular position of the rotor at each instant is detected by a system of sensors 34 (e.g., optical sensors or Hall-effect sensors). The sensor output is fed to the controller, which operates the switches according to the status of the rotor (i.e. angular position, speed and acceleration).

When a solenoid of the stator is energized, the nearby magnets of the rotor move along the circular path of the stator. The magnet is either pulled-in towards the solenoid core, or pushed-out from it, depending on the polarity of the switch associated with said solenoid, which determines the direction of flow of the current in the windings, and on the orientation of the magnets (N-N or S-S). In turn, the status of said switch is determined at each time by the controller, based on the angular position of the rotor detected by the sensors. Under the proper simultaneous operating sequence of the overall system of switches, it is possible to obtain a continuous smooth rotation of the rotor in either spinning direction. The motion of the rotor is then transferred to the load by means of a mechanical gear 63 coupled to the rotor ring, as shown in FIG. 6.

Without wishing to be bound by any specific theory, the inventors believe that a possible mechanism that leads to the reduction of the back EMF, as a result of the novel motor architecture of the invention, may be as described below. As it may be readily appreciated from FIG. 3 and the previous description, the motion of the magnets of the rotor with respect to the solenoids, is quasi-linear, namely, in direction of the axis of the solenoid. This is in contrast to the prior-art architecture in which the motion of magnets of the rotor is transversal, namely in a direction perpendicular to the axis of the solenoid.

Figure 4:
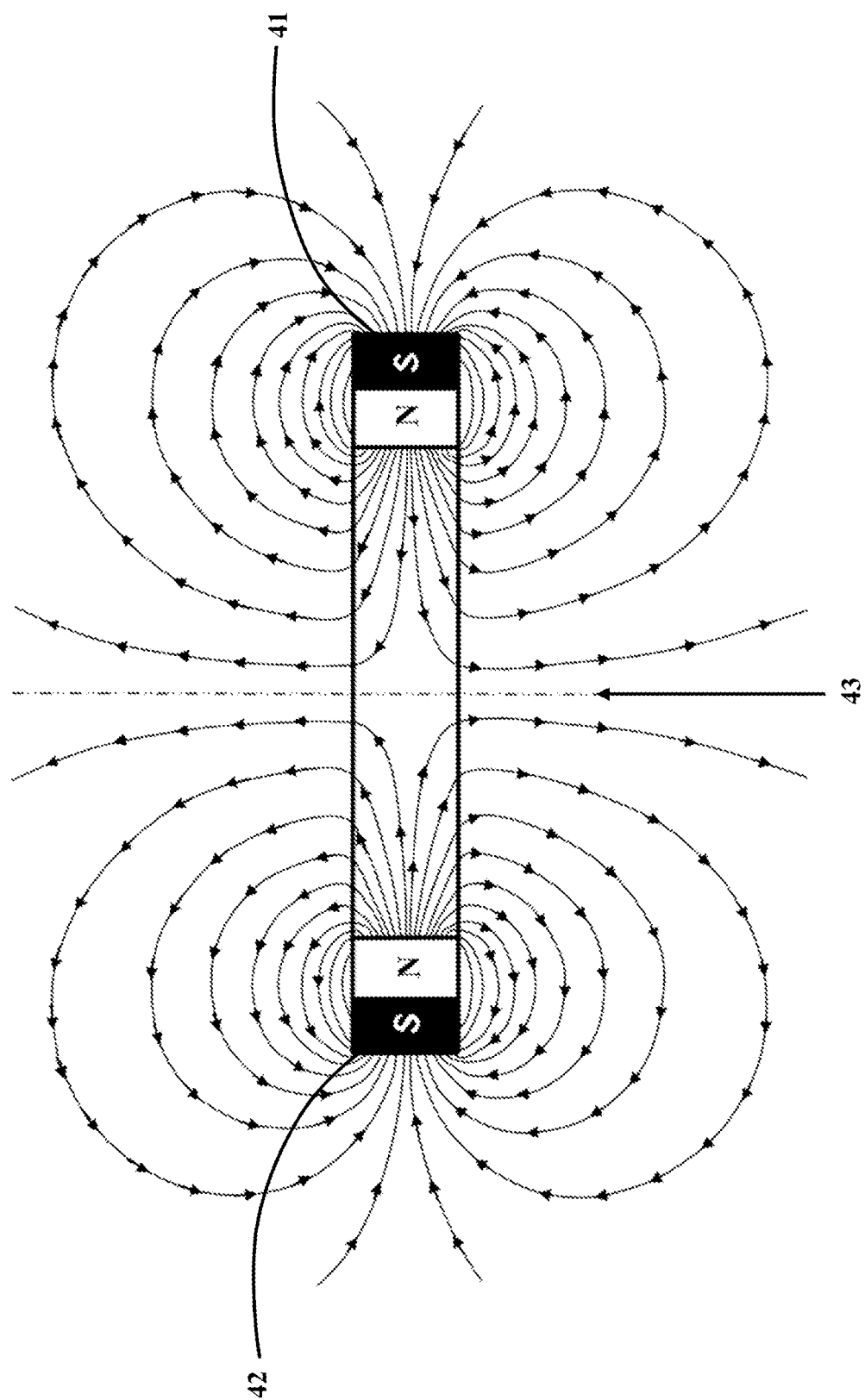
FIG. 4 illustrates the field generated by two adjacent permanent magnets.

As shown in FIG. 4, in the region between like-polarity poles (S-S or N-N) of two adjacent repelling magnets, 41 and 42, the transversal magnetic field is additive, while the axial magnetic field is subtractive. As a result, it can be shown that the (axial) magnetic field directed along the ring of the rotor in the region between the S-S or N-N poles of the magnets (and therefore in a direction along the solenoid axis) exhibits small variations between two magnets. While the transversal magnetic field contributes to the mechanical attraction/repulsion between the magnets and the solenoid (due to Lorentz's force law) it does not contribute to the magnetic flux through the solenoid. The (axial) magnetic field component, directed along the axis of the solenoid, is the one that contributes to the magnetic flux through the solenoid. However, the magnets of the rotor move in a direction collinear to the solenoid axis, and the field component in the collinear (axial) direction exhibits small variations in the region 43 between two repulsing magnets. It follows that there will be a small change in magnetic flux during the transition, through the solenoid core, of any rotor section located between any two magnets, and therefore the back EMF generated during said transition will be small. Thus, if the solenoids are energized with the proper timing sequence, the back EMF effect opposing the DC supply voltage can be made small.

The invention will now be illustrated in detail with reference to an illustrative preferred embodiment. As will become apparent from the description to follow, the embodiment shown in the figures is only one of many possible alternative systems and it has been chosen for this description in view of its simplicity, it being understood that the invention is by no means limited to said embodiment.

Reference is made to FIG. 5, which schematically shows a rotor architecture that is suitable for a circular, rotating brushless DC motor according to one embodiment of the invention. The rotor consists of a plurality of permanent magnets 51 (in the example of the figure, 5 of them are shown) separated by a high permeability material 52, as may be, for instance, iron. As is seen in the figure every two magnets 51 are separated by a segment 52 made of highly permeable material, and all the magnets and separating segments together form a ring-like structure. As explained above, it is also possible to position the permanent magnets at fixed distances between them along the circular path and to allow air to separate them. Moreover, although it may be convenient to position the magnets at identical distances between them, it may also be possible to employ an asymmetric distribution of the magnets on the circumference on which they are disposed.

Looking now at FIG. 6, a general, schematic view of the motor according to this particular embodiment of the invention is seen in its assembled, operating condition. Details of the various constructive elements of the motor shown in this figure will be further illustrated with reference to FIGS. 7-14. As can be seen in the figure, the rotor 61 rotates inside a plurality of solenoid assemblies 62. Power generated by the motor is transferred out, according to this particular embodiment, using a gear 63. The moment of the rotor is supported by bearings 64, which may be of any suitable type. In the particular embodiment of this figure the assembly is positioned on a base 65. Also shown in the figure is toothed ring 101, which will be further discussed with reference to FIG. 10.

Figure 7:
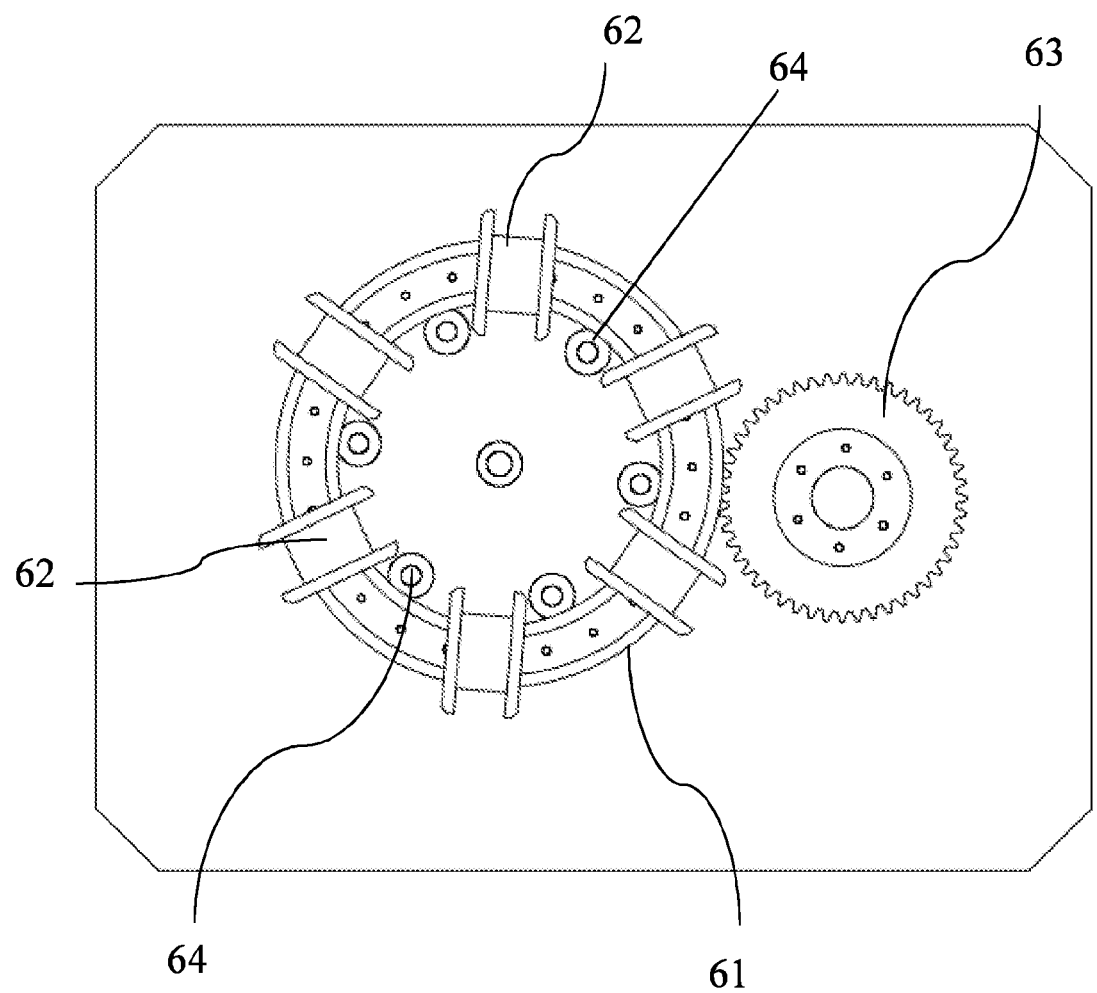
FIG. 7 is a top view of the motor of FIG. 6.
Figure 8:
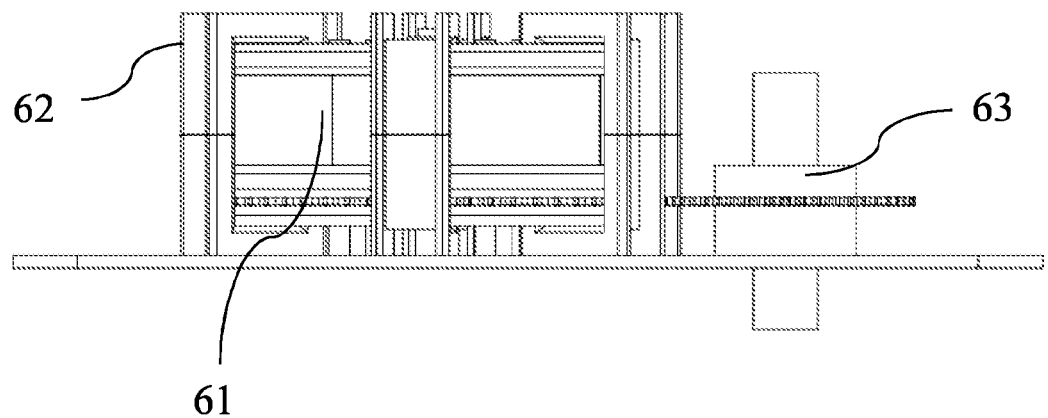
FIG. 8 is a side view of the motor of FIG. 6.
Figure 9:
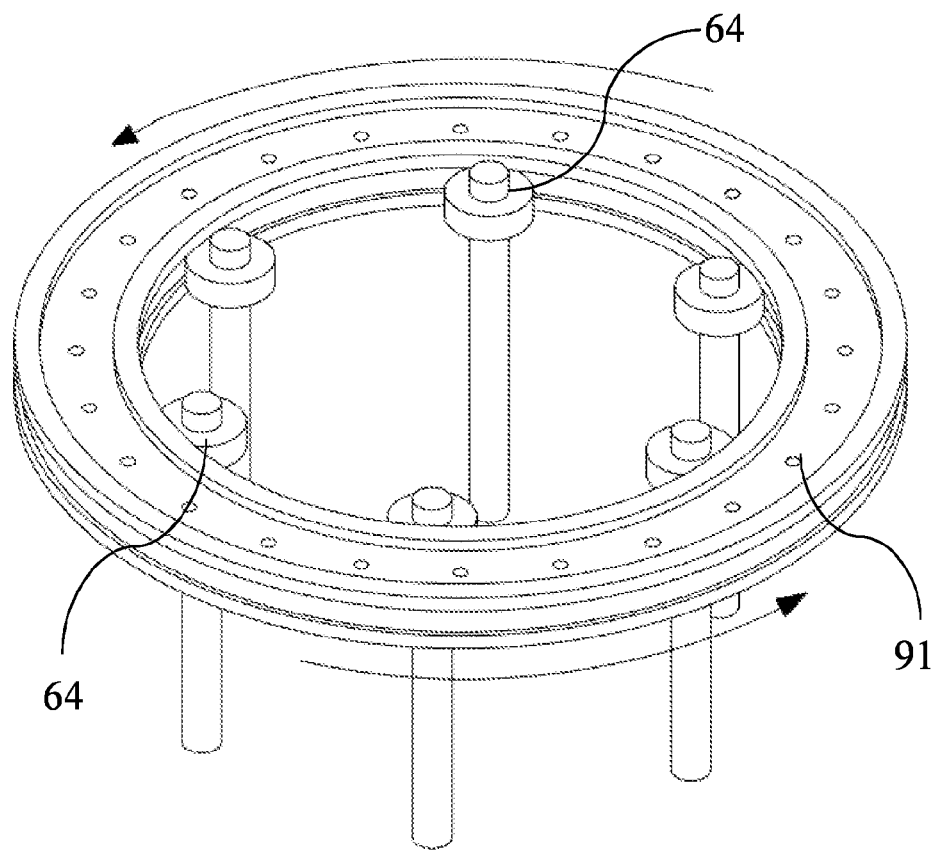
FIG. 9 illustrates the movement of the motor of FIG. 6.
Figure 10:
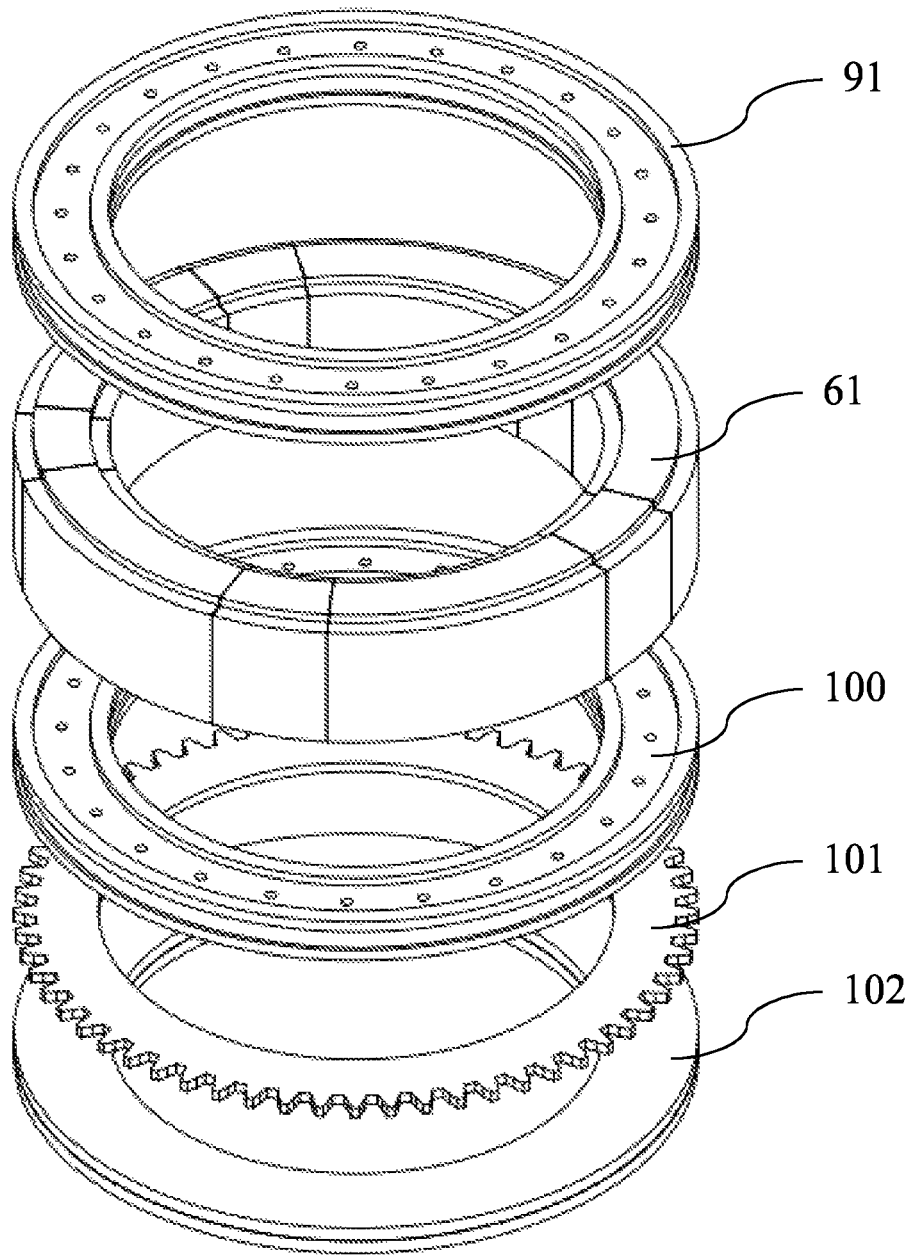
FIG. 10 illustrates the ring elements that are associated with the rotor in the motor of FIG. 6.

FIG. 7 is a top view of the motor of FIG. 6, showing the same elements, and FIG. 8 is a side view of the same motor. FIG. 9 shows the upper ring 91, which is positioned above rotor 61, and illustrates its structural relationship with bearings 64. The ring assembly associated with rotor 61 is shown in FIG. 10. According to the particular embodiment of the invention shown in this figure a number of rings are associated with rotor 61. Upper ring 91, already described with reference to FIG. 9, is positioned atop the rotor 61, and a rotor bottom ring 100 is positioned below the rotor which rests on it. Below ring 100 toothed ring 101 is in geared cooperation with gear 63 of FIG. 6. A bottom ring 102 is used to separate between base 65 of FIG. 6 and toothed ring 101. The assembly of the rings shown in FIG. 10 is connected together so that all rings rotate together and power is transferred to gear 63.

Figure 11:
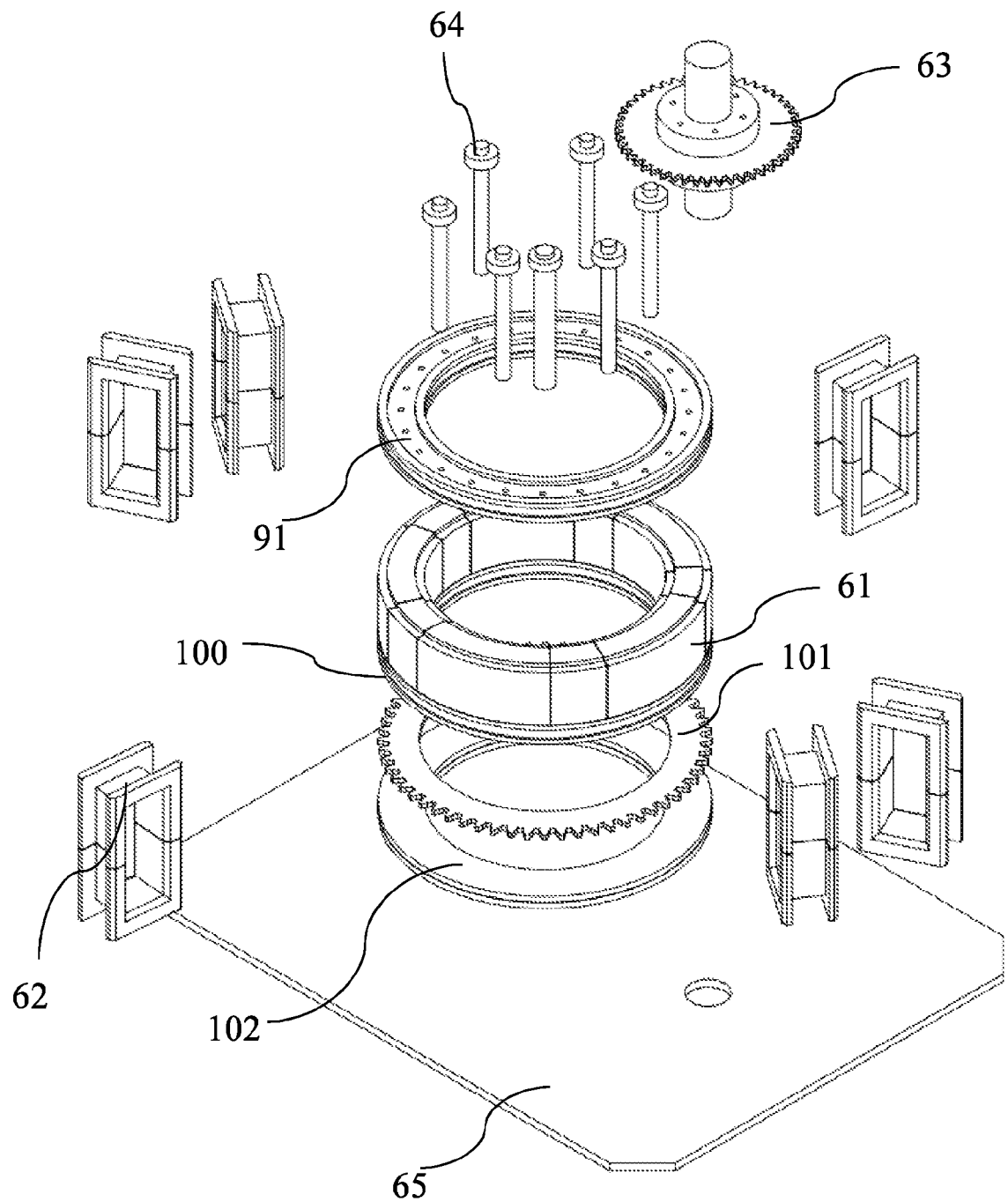
FIG. 11 is an exploded view of the motor of FIG. 6.

The motor of FIG. 6 is shown in exploded view in FIG. 11, using the same reference numbers as in the previous figures. As will be further discussed with reference to FIG. 14, the solenoid housing 62 is conveniently made of two pieces, to make the assembly possible.

Figure 12A:
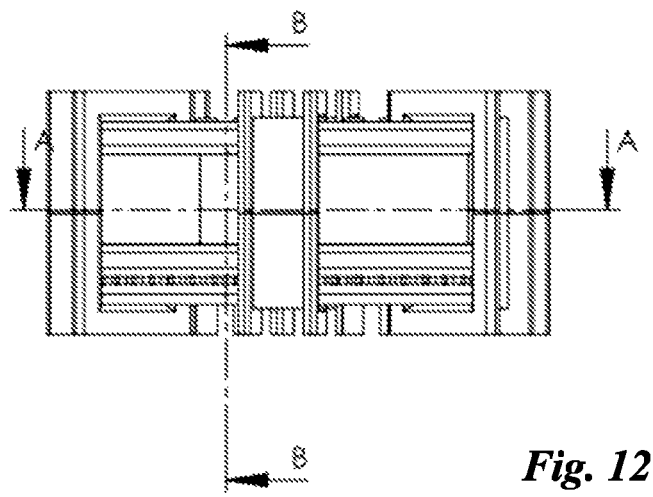
FIG. 12(a) is a side view of the motor of FIG. 6.
Figure 12B:
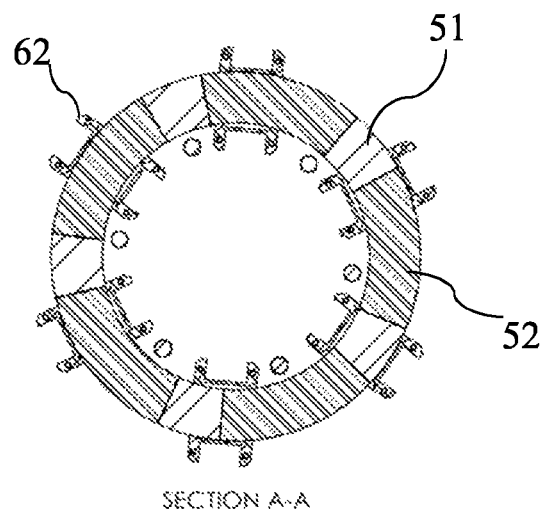
FIG. 12(b) is a cross section of FIG. 12(a) along the line A-A.
Figure 12C:
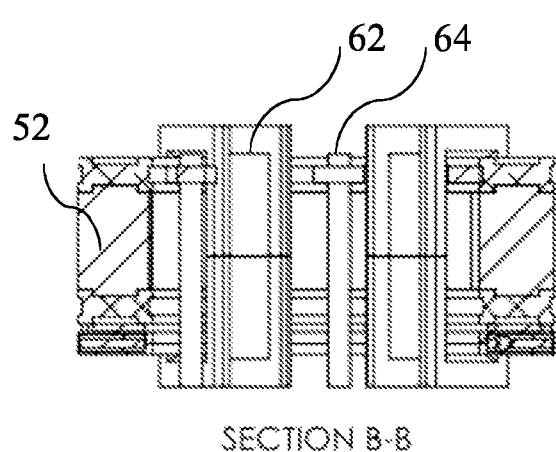
FIG. 12(c) is a cross-section of FIG. 12(a) along the line B-B.
Figure 13B:
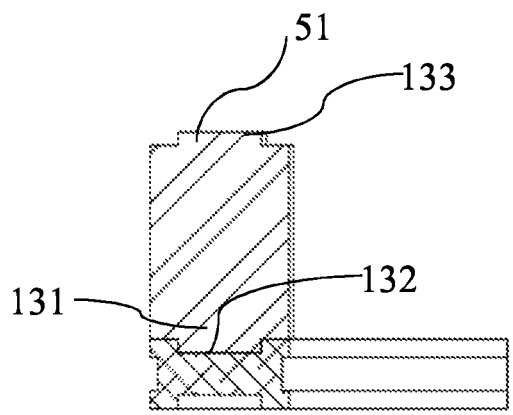
FIG. 13(b) illustrates a cross section of FIG. 13 (a) along the line D-D, showing the connection of permanent magnets of the rotor to the bottom ring of FIG. 10.
Figure 13C:
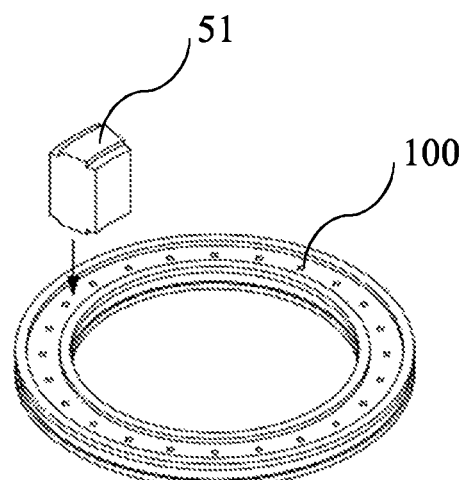
FIG. 13(c) illustrates a magnet during placement into a groove of the ring of FIG. 13(a)
Figure 13A:
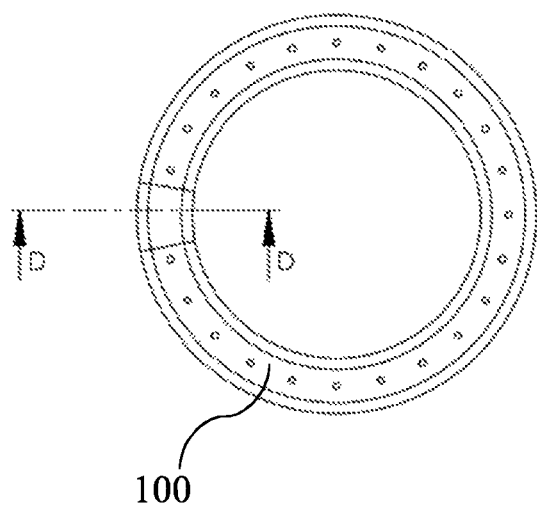
FIG. 13(a) is a bottom view of the bottom ring of FIG. 10.
Figure 13D:
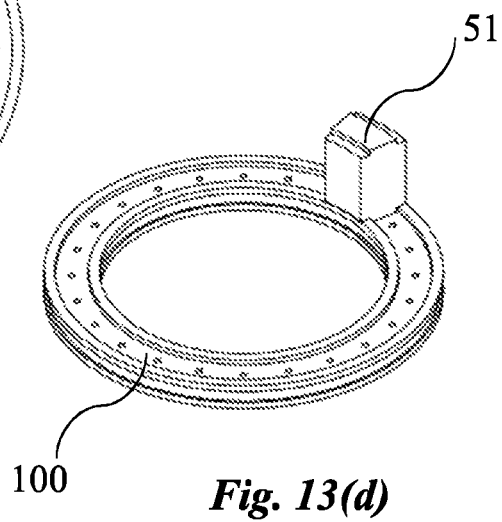
FIG. 13(d) is a perspective view of FIG. 13(b), showing one permanent magnet.

FIG. 12 further illustrates the motor of FIG. 6, with its central part being shown in FIG. 12(*a*). Two cross-sections are further shown in the figure, with Section A-A being an horizontal cross-section (FIG. 12(*b*)), and Section B-B being a vertical cross-section. FIG. 13 illustrates the positioning of the permanent magnets 51 on ring 100. FIG. 13(*b*) is a cross-section of ring 100 of FIG. 13(*a*), taken along the D-D plane, showing a magnet 51 in place. According to this specific embodiment of the invention, lower protrusion 131 of permanent magnet 51 fits its female counterpart, i.e. groove 132 in lower ring 100, while its upper protrusion 133 fits a similar groove in upper ring 91 (not shown in the figure). FIG. 13(*c*) shows magnets 51 during its placement into the groove of ring 100, and FIG. 13(*d*) is a perspective view of one such magnet already in place, as in FIG. 13(*b*). The additional magnets, as well as the separating high permeability material (52 of FIG. 5) are similarly located, and when all elements have been placed and rings 91 and 100 are put in place, the rotor assembly is ready to be positioned above toothed ring 101.

Figures 14A, 14B:
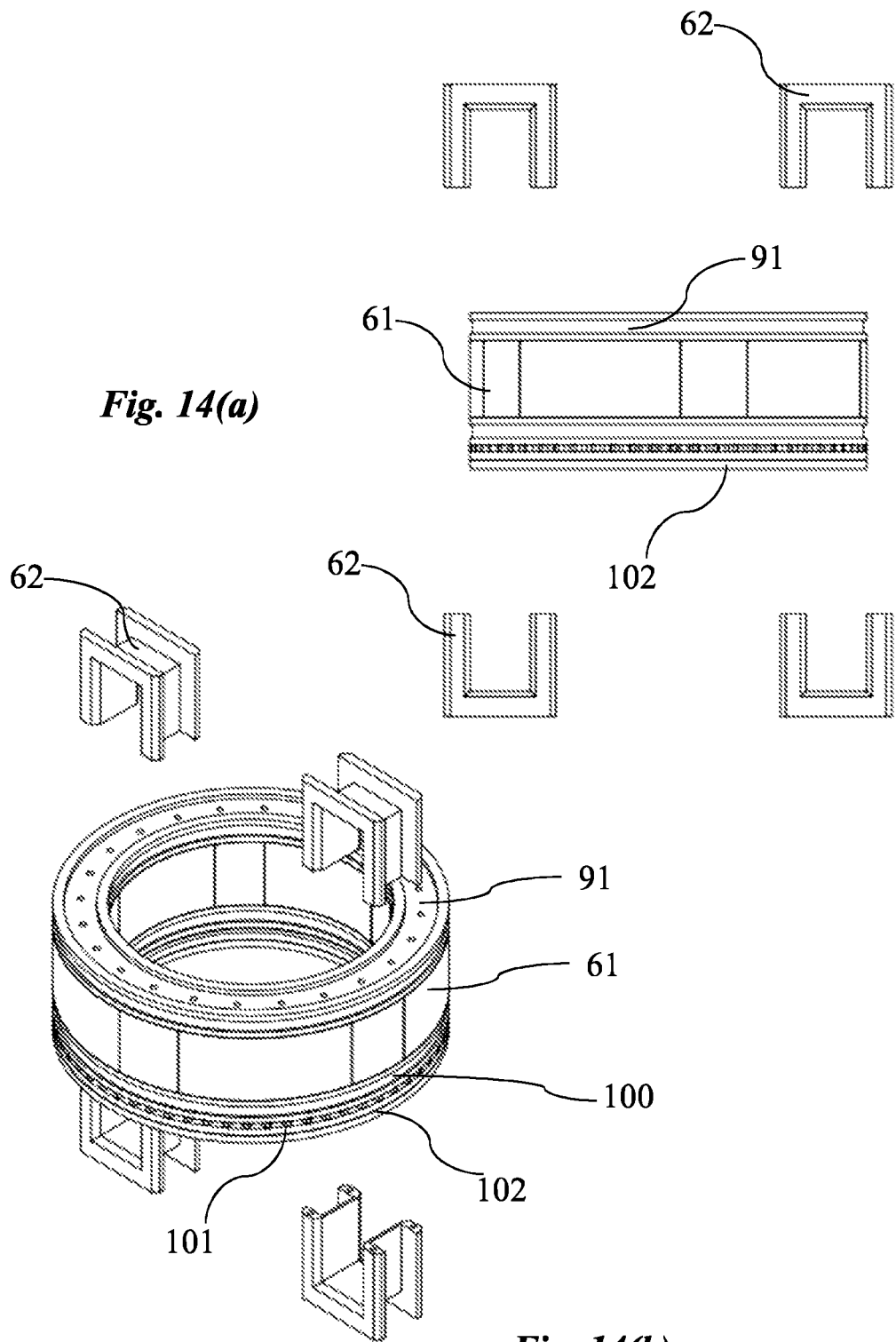
FIGS. 14 (a) and 14(b) illustrates in side and perspective views, respectively, the assembly of the solenoid houses on the rotor assembly.

The various elements and their assembly is further illustrated in FIG. 14, where the various parts are identified by the same numerals as in the previous figures. Looking now at FIGS. 3 and 6, to be understood that solenoid housings 62 will be provided with a coil around them, which in turn will be connected to a DC supply.

Turning now to FIG. 15, an alternative rotor architecture is illustrated, comprising a plurality of structures consisting of a magnet 151 which is fixed on a base (not shown), and is flanked by a high-permeability material 152, such as iron, on both sides. Gaps, indicated by arrow 153, are left between each such two structures.

Figure 16A:
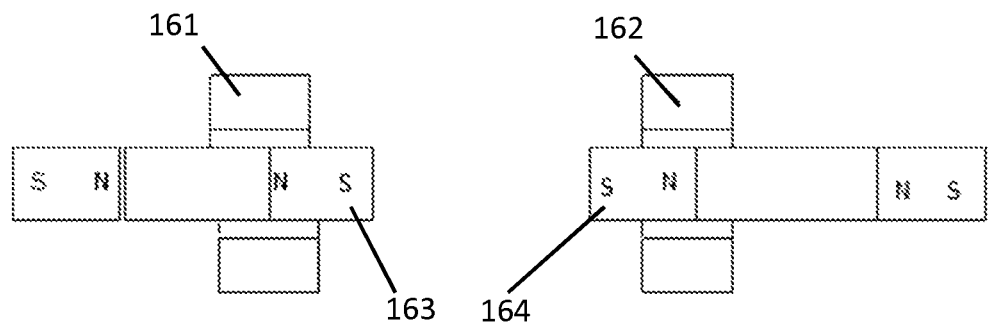
FIG. 16 (a) illustrates the position of the poles of the magnets inside the solenoid, for minimizing the EMF.
FIG. 16(b) is a graph corresponding to the pole position of FIG. 16(a), showing when the EMF ideally reaches down to zero.
Figure 16B:
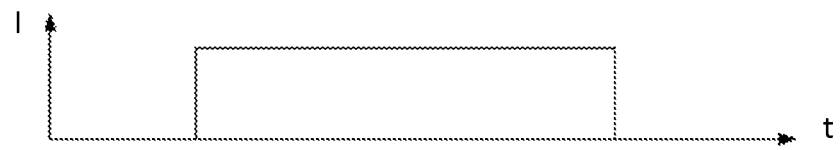

FIG. 16(*a*) is a schematic cross-sectional representation of the position of the magnets within the solenoids, which minimize the EMF of the system. In the figure two solenoids 161 and 162 are shown, with the South poles 163 and 164 positioned outside the solenoid. In this situation the EMF may ideally reach down to zero, as illustrated in FIG. 16(*b*).

As will be appreciated by the skilled person the above description of one specific embodiment of the invention is designed to illustrate the invention in simple terms, but is not intended to limit the invention in any way. Many modifications can be made to the motor of the invention. For instance, the number of permanent magnets in the rotor can be increased or decreased, many different mechanical arrangements can be provided in order to transmit the power generated by the motor, and the gear shown in the specific, illustrative embodiment described above is just one of many alternative structures. Moreover, many different ways and schemes for controlling the operation of the motor can be devised, including controllers, software and sensors, all of which is within the scope of the skilled person and therefore has not been described hereinabove for the sake of brevity.

The invention claimed is:

1. A brushless DC motor capable of generating a substantially constant torque regardless of an angular velocity of its rotor, comprising
   a) a circular rotor comprising a plurality of circumferentially separated permanent magnets and a plurality of spacers made of high magnetic permeability material, each of said spacers being interposed between two of said permanent magnets to reduce variations in axial magnetic flux; and b) a plurality of circumferentially spaced solenoids provided each around a static solenoid housing, wherein said solenoid housing is structured with a void portion through which said plurality of magnets can pass when said rotor rotates around its axis, wherein motion of the magnets with respect to the solenoids is quasi-linear in the direction of a solenoid axis, wherein each of said plurality of solenoids is energized with a timing sequence to ensure that it will interact with only one of said permanent magnets at any given time, thereby minimizing back electromotive force (back EMF).

2. A brushless DC motor according to claim 1, wherein the number of solenoids equals the number of permanent magnets.

3. A brushless DC motor according to claim 1, wherein the number of solenoids is greater or smaller than the number of permanent magnets.

4. A brushless DC motor according to claim 1, further comprising one or more sensors suitable to determine the position of the permanent magnets relative to the solenoids.

5. A brushless DC motor according to claim 4, further comprising a controller suitable to supply current for the solenoids in response to a determination by one or more of the sensors regarding a position of the magnets relative to the solenoids.

6. A brushless DC motor according to claim 1 wherein the rotor further comprises one or more structural ring elements.

7. A brushless DC motor according to claim 6, wherein the rotor is mechanically connected to power-transmitting means.

8. A brushless DC motor according to claim 7, wherein the power-transmitting means comprise a toothed element.

9. A brushless DC motor according to claim 1, wherein a circumferential length of each of the spacers is at least twice as long as the circumferential length of each of the permanent magnets.

10. A brushless DC motor according to claim 1, wherein the rotor is annular.

11. A brushless DC motor according to claim 1, wherein a circumferential dimension of each of the solenoids is substantially equal to a circumferential dimension of each of the permanent magnets.

12. A method for operating a brushless DC motor, comprising the steps of causing a plurality of permanent magnets to move with respect to a plurality of solenoids in a quasi-linear motion in the direction of the axis of the solenoid, and energizing said plurality of solenoids by a timing sequence that ensures that each of said solenoids will interact with only one of said permanent magnets at any given time, thereby reducing back EMF.

13. A method for operating a brushless DC motor, comprising the steps of:

a) providing on a circular structure, a plurality of circumferentially separated permanent magnets and a plurality of spacers made of high magnetic permeability material arranged such that each of said spacers is interposed between two of said permanent magnets;

b) providing a plurality of solenoids around a static solenoid housing, wherein said solenoid housing is structured with a void portion through which said plurality of magnets and said plurality of speacers can pass when the circular structure rotates around its axis; and c) energizing each of said plurality of solenoids by a timing sequence that causes said circular structure to rotate, while causing magnetic flux through one of said solenoids as a result of an interaction with one of said plurality of magnets passing therethrough at a given time, by virtue of a constraining action provided by the spacer adjacent to said interacting magnet, to be substantially constant along a circumferential length of said adjacent spacer, thereby minimizing back EMF.

\* \* \* \* \*